United States Patent
Lapp et al.

(10) Patent No.: US 7,970,503 B2
(45) Date of Patent: Jun. 28, 2011

(54) METHOD AND APPARATUS FOR DETECTING ANOMALIES IN LANDING SYSTEMS UTILIZING A GLOBAL NAVIGATION SATELLITE SYSTEM

(75) Inventors: Tiffany R. Lapp, Snohomish, WA (US); Timothy Allen Murphy, Everett, WA (US)

(73) Assignee: The Boeing Company, Chicago, IL (US)

( * ) Notice: Subject to any disclaimer, the term of this patent is extended or adjusted under 35 U.S.C. 154(b) by 365 days.

(21) Appl. No.: 11/854,217

(22) Filed: Sep. 12, 2007

(65) Prior Publication Data
US 2009/0069960 A1    Mar. 12, 2009

(51) Int. Cl.
*G05D 1/06* (2006.01)
(52) U.S. Cl. ......................................................... 701/17
(58) Field of Classification Search .................. None
See application file for complete search history.

(56) References Cited

U.S. PATENT DOCUMENTS

| 5,216,611 | A | 6/1993 | McElreath |
| 5,600,329 | A | 2/1997 | Brenner |
| 5,786,773 | A | 7/1998 | Murphy |
| 5,995,043 | A | 11/1999 | Murphy |
| 6,178,363 | B1 | 1/2001 | McIntyre et al. |
| 6,549,829 | B1 | 4/2003 | Anderson et al. |
| 6,845,304 | B1 | 1/2005 | Young |
| 2005/0182530 | A1 | 8/2005 | Murphy |
| 2006/0167619 | A1* | 7/2006 | Arethens ........................ 701/120 |

OTHER PUBLICATIONS

EP search report dated Apr. 4, 2010 for application EP08253010.

* cited by examiner

*Primary Examiner* — Michael J. Zanelli
(74) *Attorney, Agent, or Firm* — Yee & Associates, P.C.; Wilson Royer

(57) ABSTRACT

A method, apparatus, and computer program product for detecting anomalies in a landing system. In one embodiment, a magnitude difference between a blended inertial deviation magnitude and a raw deviation magnitude is identified to form a magnitude difference. The magnitude difference is compared to a magnitude threshold. If the magnitude difference exceeds the magnitude threshold, an anomaly in the data is detected.

20 Claims, 13 Drawing Sheets

| | SYSTEM INTEGRATOR | THIRD PARTY | OPERATOR |
|---|---|---|---|
| 102 SPECIFICATION AND DESIGN | X | X | X |
| 104 MATERIAL PROCUREMENT | X | X | |
| 106 COMPONENT AND SUBASSEMBLY MANUFACTURING | X | X | |
| 108 SYSTEM INTEGRATION | X | | |
| 110 CERTIFICATION AND DELIVERY | X | | |
| 112 IN SERVICE | | | X |
| 114 MAINTENANCE AND SERVICE | X | X | X |

METHOD AND APPARATUS FOR DETECTING ANOMALIES IN LANDING SYSTEMS UTILIZING A GLOBAL NAVIGATION SATELLITE SYSTEM

BACKGROUND INFORMATION

1. Field

The present disclosure relates generally to processing data, in particular, to landing systems. Still more particularly, the present disclosure relates to a method, apparatus, and computer usable program code for detecting data anomalies in a landing system utilizing a global navigation satellite system.

2. Background

An autopilot is a system used to guide a vehicle, such as an airplane, with little or no intervention by a human. Autopilots typically rely on signals transmitted from a ground based station. These signals are used to determine the position of the vehicle with respect to other objects, such as the runway. The autopilot reads its position from a guidance system, such as an instrument landing system (ILS). The autopilot uses error reduction systems to identify and dissipate errors in the navigation information. Errors may occur due to problems such as loss of signal, beam bends, noise, multi-pathing, and oscillatory behavior occurring during over flight interference or fly-through events.

Global navigation satellite system (GNSS) based landing systems (GLS) for aircraft are becoming more widespread as they offer improved accuracy in navigation for takeoff, landing, and autopilots.

GNSS is a navigation system that allows small receivers to determine their position with respect to the earth using signals transmitted from satellites. This system typically permits geo-spatial positioning with world wide coverage. GLS is a system that combines satellite and ground-based navigation information to provide aircraft positional information with respect to a pre-defined approach path during approach, landing and rollout.

A key issue with GLS is the expected failure modes and effects of failures in the GLS guidance system. It is anticipated that the most common failure mode for GLS is the total loss of signal from satellites for hundreds of seconds. Consequently, a GNSS/inertial coasting filter has been developed to provide continuity of service through these outages by continuing to provide inertially derived position information when the GLS guidance is unavailable.

The inertial coasting filter provides aircraft systems with a reliable backup form of guidance when the GLS guidance signals are unusable. The guidance system responds as rapidly as possible to switch to inertial guidance to prevent the inertially based deviations from becoming corrupted by the errors in the GLS signals.

Errors in GLS systems generally occur at a much lower frequency than errors associated with other guidance sources, such as instrument landing systems. However, GLS may experience discrete changes or steps in these steady state errors which occur in fault-free operation of the system as satellites rise and set.

The integrity of a GLS guidance system is frequently specified in terms of an alert limit. An alert limit is a limit on the maximum allowable GLS error on differentially corrected deviations transmitted without annunciation of the problem to the flight crew. However, current standards do not limit the dynamic behavior of the error when the error is within the alert limits. This poses a potential problem for the inertial coasting filter scheme which uses low-frequency information from the nominal GLS deviations to establish an accurate inertial reference.

ILS inertial coasting has a coasting duration limitation of approximately 20 seconds or less which allows adequate time for a backup station to come on line without requiring the approach to be aborted. However, given the potential total loss of GLS signal for hundreds of seconds, to allow an approach to be completed from the alert height in the presence of such failures, the GLS coasting duration must be expanded to 60 seconds or more. To accomplish this safely, more precise inertial coasting is required. Thus, there is a wider range of detrimental error rates for current GLS than ILS systems. For example, if the reference error on the GLS deviations increases at a low enough frequency, the errors will be incorporated into the blended solution via the inertial bias estimate, while the conflicting inertial low-frequency information is rejected. Such a corrupted inertial reference, over time, can lead to touchdown and rollout off the runway. Such problems lead to decreased safety for passengers.

Further complicating the problem is the fact that, due to the high probability of error steps occurring as a result of normal satellite configuration changes, such as during satellite rising and setting, these error events need to be differentiated from error events that require action to be taken to remove negative impact on the GLS auto-land performance. Thus, due to the differences between ILS and GLS, current anomaly detection methods used in ILS based systems cannot be safely and accurately used for anomaly detection in current GLS based navigation systems.

In other words, current GLS landing systems do not employ coast-skip reset filters or take full advantage of the continuity provided by coast-skip reset filters. To enable this, it would be desirable to detect a wide range of ramp errors which are not detectable by current state of the art anomaly detectors.

SUMMARY

The different advantageous embodiments provide a computer implemented method, apparatus, and computer program product for detecting data anomalies in a landing system. In one embodiment, a magnitude difference between a blended inertial deviation magnitude and a raw deviation magnitude is identified to form a magnitude difference. The magnitude difference is compared to a magnitude threshold. If the magnitude difference exceeds the magnitude threshold, an anomaly in the data is detected.

Another embodiment comprises a computer program product on a computer usable medium having computer usable program code for detecting data anomalies in a landing system. The computer program product includes computer usable program code to identify a magnitude difference between a blended inertial deviation magnitude and a raw deviation magnitude in a landing system associated with a global navigation satellite system to form a magnitude difference; compare the magnitude difference to a magnitude threshold; and trigger inertial coasting in response to the magnitude difference exceeding the magnitude threshold.

In another embodiment, the apparatus has an anomaly detector in a landing system associated with a global navigation satellite system. The anomaly detector includes a coasting filter. The coasting filter generates a blended inertial deviation magnitude and a blended inertial deviation rate. A coast skip reset trigger anomaly detector identifies a magnitude difference between the blended inertial deviation magnitude and a raw deviation magnitude to form a magnitude difference and compares the magnitude difference to a magnitude threshold and detects an anomaly in the data in response to the magnitude difference exceeding the magnitude threshold, an anomaly in the data is detected.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figures 1, 2:
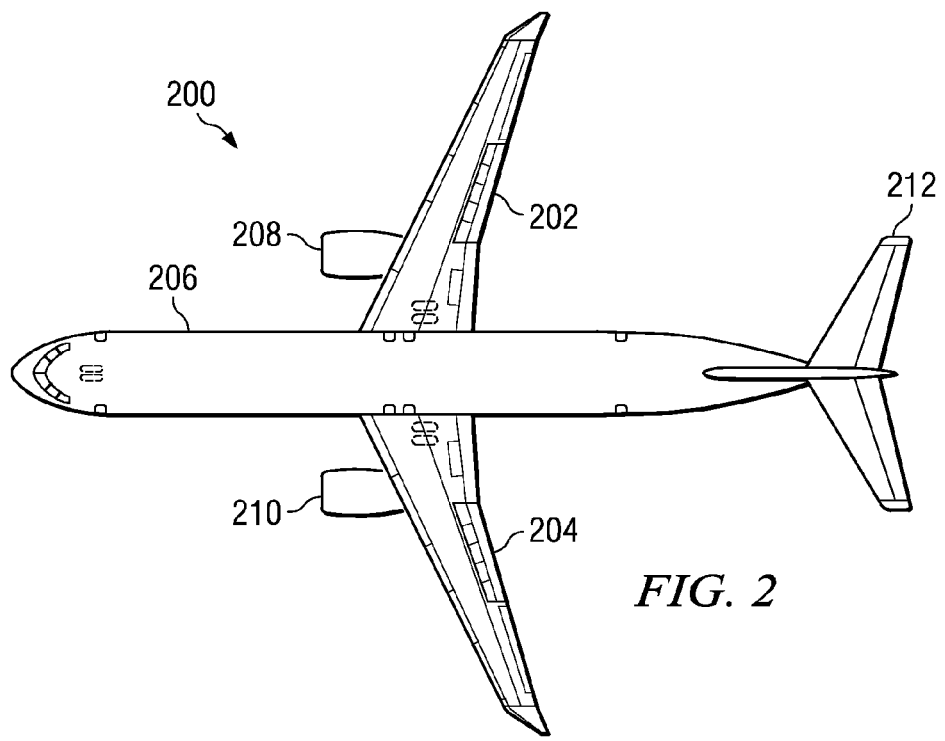
FIG. 1 is a diagram illustrating an aircraft manufacturing and service method in accordance with an advantageous embodiment.
FIG. 2 is a diagram of an aircraft in accordance with an advantageous embodiment.

Referring more particularly to the drawings, embodiments of the disclosure may be described in the context of the aircraft manufacturing and service method as shown in FIG. 1 and the aircraft as shown in FIG. 2.

Turning first to FIG. 1, a diagram illustrating an aircraft manufacturing and service method is depicted in accordance with an advantageous embodiment. During pre-production, aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of method 100 may be performed or carried out by a system integrator, a third party, and/or an operator as indicated by the "X" in the grid to the right of the flow diagram of FIG. 1. In these examples, the operator may be a customer. For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 has wings 202 and 204 attached to body 206. Aircraft 200 includes wing mounted engine 208, wing mounted engine 210, and tail 212. Aircraft 200 is produced by aircraft manufacturing and service method 100.

Apparatus and methods embodied herein may be employed during any one or more of the stages of production and service method 100 in FIG. 1. For example, components or subassemblies corresponding to component and subassembly manufacturing 106 may be fabricated or manufactured in a manner similar to components or subassemblies produced while aircraft 200 is in service. Also, one or more apparatus embodiments, method embodiments, or a combination thereof may be utilized during production stages for component and subassembly manufacturing 106 and system integration 108 in FIG. 1, for example, by substantially expediting assembly of or reducing the cost of aircraft 200. Similarly, one or more of apparatus embodiments, method embodiments, or a combination thereof may be utilized one of during different stages, such as component and subassembly manufacturing 106, and system integration 108, in service 112, and/or routine maintenance and service 114 of aircraft 200 in FIG. 2.

In this illustrative example, aircraft 200 includes a GNSS landing system (GLS) and an anomaly detector for detecting data anomalies in the GLS data. The anomaly detector may be implemented using a computing device for receiving and analyzing signals received from satellites and/or ground-based stations, such as, without limitation, the data processing system described in FIG. 3 below.

Figure 3:
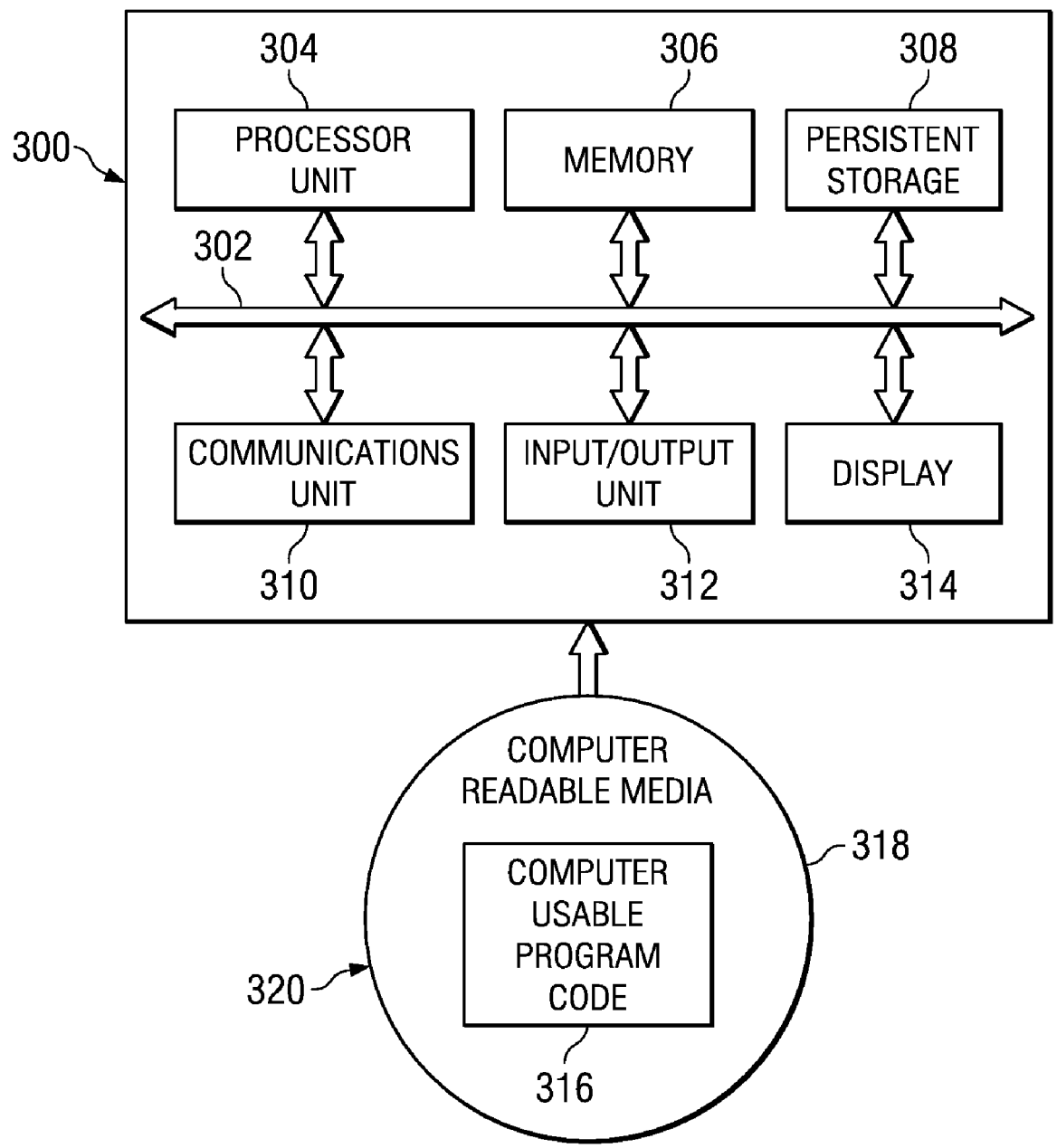
FIG. 3 is a diagram of a data processing system in accordance with an advantageous embodiment.

Turning now to FIG. 3, a diagram of a data processing system is depicted in accordance with an advantageous embodiment. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multiprocessor system containing multiple processors of the same type.

Memory 306, in these examples, may be, for example, a random access memory. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as computer usable program code or computer readable program code that may be read and executed by a processor in processor unit 304.

The computer readable program code may be embodied on different physical or tangible computer readable media, such as memory 306 or persistent storage 308.

Computer usable program code 316 is located in a functional form on computer readable media 318 and may be loaded onto or transferred to data processing system 300. Computer usable program code 316 and computer readable media 318 form computer program product 320 in these examples. In one example, computer readable media 318 may be, for example, an optical or magnetic disc that is inserted or placed into a drive or other device that is part of persistent storage 308 for transfer onto a storage device, such as a hard drive that is part of persistent storage 308. Computer readable media 318 also may take the form of a persistent storage, such as a hard drive or a flash memory that is connected to data processing system 300.

Alternatively, computer usable program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the computer readable program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

Conventional autopilots with only minor or no reliance on inertial inputs are sensitive to ILS beam imperfections, such as beam bends, noise, multi-pathing, and oscillatory behavior of signals received from satellite and ground stations. Inertial inputs are provided by an inertial guidance system. An inertial guidance system is a system that provides the position, orientation, and velocity of a vehicle by using an inertial reference frame. The inertial guidance system typically integrates information gathered from a combination of gyroscopes and accelerometers to determine the linear and angular accelerations of the system in the inertial frame.

Complementary filtering of instrument landing systems (ILS) position information with inertially-derived acceleration or velocity results in a very marked attenuation of airplane response to beam disturbances. The reference complementary filter structure not only blends inertial information with deviation input, but additionally enables the deviation input to the complementary filter to be removed while deviations continue to be provided and/or derived from the remaining inertial information.

The filter configuration, with deviation input removed, is termed inertial coasting. Inertial coasting allows for continuity in the guidance input to the autopilot during ILS station outages while the backup station is coming online. Additionally, given the rapid rate changes associated with unacceptable ILS noise and interference, the inertially complemented deviations can be compared with the ILS position information to reject unacceptable deviation input and trigger inertial coasting to smooth the autopilot's response to this anomalous guidance. This enhances passenger comfort through these events and ensures safe guidance through beam hardovers.

The use of ILS inertial coasting deviations is limited to sufficiently span these signal outage and error causing events. This limit, imposed via annunciation to the flight crew of mode failure in the effected axis, is in place to eliminate accuracy concerns related to potential for coasting filter corruption by ILS beam bends.

In contrast to ILS, GLS has not been in wide use. GLS can currently support category I approach and auto-land. A category I approach and auto-land is a category that permits pilots to land with a decision height of approximately 200 feet and a forward visibility of approximately 2400 feet. A simple autopilot is sufficient for category I. Category II permits pilots to land with a decision height of approximately 100 feet and a forward visibility of 1000 feet. At category III, pilots can land with a decision height as low as 50 feet and a forward visibility of 700 feet. Current GLS systems cannot be used to support category II and category III operations due to the expected failure modes and effects of the GLS guidance system.

The most common failure mode expected for GLS is a total loss of the signal for hundreds of seconds. A GPS/inertial "coasting" filter scheme was developed for GLS that is similar to ILS complementary filter used to provide continuity in guidance through station outages. The GPS/inertial coasting filter scheme includes features allowing increased accuracy and, thus, an extended coasting duration to enable the airplane to continue to land and rollout after a total loss of GLS guidance below the alert height.

The GPS/inertial coasting filter scheme depends on the premise that the inertial error remains relatively constant through the duration of the approach. Inertial error, dominated by accelerometer tilt error conforms to this premise, varying slowly enough that it can be estimated to a high degree of precision. This error is estimated in the GLS coasting filters and used to correct the inertial inputs during coasting operation.

The different advantageous embodiments recognize that inertial coasting for GLS requires the GLS ground station to provide the aircraft systems with information required to determine with certainty when the GLS guidance signals are unusable. The guidance system must respond rapidly to switch to inertial guidance to prevent the inertial signals from becoming corrupted by errors in the GLS signals. Unfortunately, the ground station cannot communicate the status of the guidance signals instantaneously, and therefore, the possibility of corruption still exists. During a failure condition, it is possible for a differential GPS ground station to provide corrupted data for up to three (3) seconds before raising an alarm.

In other words, the ground station may continue to send a corrupted signal for up to three seconds before the guidance system becomes aware of the fact that the signal is corrupted. Thus, the guidance system will have been using a bad signal for determining position and location of the aircraft for those three seconds.

Furthermore, the airplane is allowed to continue to use the last data provided by the ground station for up to three (3) seconds after the airborne receiver stops receiving data. Consequently, there may be a three to six second delay between GPS signal corruption and detection of the corruption by the airborne receiver.

ILS inertial coasting has a coasting duration limitation varying from approximately 20 seconds down to approximately 4 seconds, depending on altitude. Current navigational systems do not utilize the coast-skip reset feature. The coast-skip reset feature of the advantageous embodiments uses the low-frequency information from the nominal GLS deviations and buffered internal filter states to free the coasting filter from corruption and establish an accurate inertial reference.

In addition, the advantageous embodiments recognize that nominal low-frequency error characteristics of GLS guidance, in combination with coast-skip reset features described herein, enable the accuracy required to remove the coasting duration limitation imposed on ILS inertial coasting.

The current GLS coasting filter design is still subject to misguidance from the corruption of the filter during this three to six second failure exposure. This potential for corruption of the filter exists in the currently available ILS/inertial filtering scheme, however, any negative impact of this corruption is bounded by the shorter coasting duration required. Coasting from the alert height through rollout is needed to supplement continuity GLS for fail-operational auto-land. Therefore, a method to uncorrupt the filter from an anomalous GLS signal is needed.

The currently available GPS/inertial skipping filter scheme allows the coasting filter to recover from up to six (6) seconds of signal corruption and avoid subsequent misguidance. The decontamination of the complementary filter is accomplished by buffering inertial bias error and bias error rate information, held from sufficiently long ago, to guarantee their integrity has not been compromised. The corruption-free inertial error and error rate estimates are then used to provide a correction for the inertial information so that the sum can be integrated appropriately and a correct deviation can be produced from the filter even when the GLS deviation input is removed from the solution.

The advantageous embodiments recognize that failure-free errors in GLS occur at a much lower frequency than errors in ILS. Unique to GLS, however, are the steps in which the errors occur in fault-free operation, as satellites rise and set. In GPS system failures, ramps and steps of virtually any magnitude and speed are feasible but the exposure time should be limited by ground based augmentation systems (GBAS) time to alert and allowance for missed messages. Ionosphere gradient anomalies have been found to have very slowly varying effects but similarly present themselves in the form of a ramping error.

The integrity of a GLS guidance system can be specified in terms of an alert limit which is essentially a limit on the maximum allowable GLS error on the differentially corrected deviations transmitted without annunciation. Current standards do not limit the dynamic behavior of the error when it is within the alert limits. The advantageous embodiments recognize that this poses a potential problem for the coast-skip reset, which uses the low-frequency information from the nominal GLS deviations to establish an accurate inertial reference. The nominal low-frequency error characteristics of GLS guidance are what, in combination with the coast-skip reset, enable the accuracy required to remove the coasting duration limitation imposed on ILS inertial coasting. If the reference error on the GLS deviations is increasing at a low enough frequency, it will be incorporated into the blended solution via the inertial bias estimate while the conflicting inertial low-frequency information is rejected. Such a corrupted inertial reference can, over time, lead to touchdown and rollout off the runway, which is unacceptable for category II and category III operations.

The advantageous embodiments recognize that ramp errors have the potential to cause noticeable flight path deviations, depending on the ramp rate of the error applied, even with the ILS anomaly detection enabled. Even if a coasting filter associated with the aircraft guidance system is outfitted with coast-skip reset to provide continuity for signal loss below the alert height and remove corruption due to ground station detected failures, the aircraft is still subject to that maximum of six (6) seconds exposure time to the failure in progress due to the faulty data. Those six seconds of exposure can result in deviations on the order of tens to hundreds of feet depending on the nature of the failure. Deviation of this magnitude from the true glidepath or from runway centerline while early in the approach is likely not an issue. However, below the alert height, such a deviation from the desired path can pose a serious safety concern. In other words, the errors can cause the aircraft to be hundreds of feet away from the center of the runway during take-off or landing, which could result in difficulties during take-off and landing, an inability to take-off or land, or even collisions with other vehicles or structures.

The advantageous embodiments recognize that due to the extension of the inertial coasting duration for GLS approaches, there is a wider range of detrimental error rates for GLS than ILS. Further complicating the problem, due to the high probability of error steps due to normal satellite configuration changes, these error events must be differentiated from those for which actions should be taken to remove negative impact on GLS auto-land performance. Thus, to take full advantage of the continuity provided by the coast-skip reset filter, it is necessary to detect a wide range of ramp errors which are not detectable by current state of the art anomaly detectors.

Therefore, the different advantageous embodiments provide a method, apparatus, and computer usable program code for detecting data anomalies in a landing system utilizing a global navigation satellite system. Anomalous GLS data may be caused by, but not limited to, satellite motion, location, satellite configuration changes, or any fault-free operation as satellites rise and set.

In one embodiment, a magnitude difference between a blended inertial deviation magnitude and a raw deviation magnitude is identified to form a magnitude difference. The magnitude difference is compared to a magnitude threshold. If the magnitude difference exceeds the magnitude threshold, an anomaly in the data is detected.

Likewise, a deviation rate is compared to a deviation rate threshold. If the deviation rate exceeds the deviation rate threshold and a step detector indicates a ramp has occurred rather than a step, an anomaly in the data is detected. As used herein, the deviation magnitude threshold and the deviation rate threshold are fixed values to which the anomaly detection input is compared to set a coast status.

Figure 4:
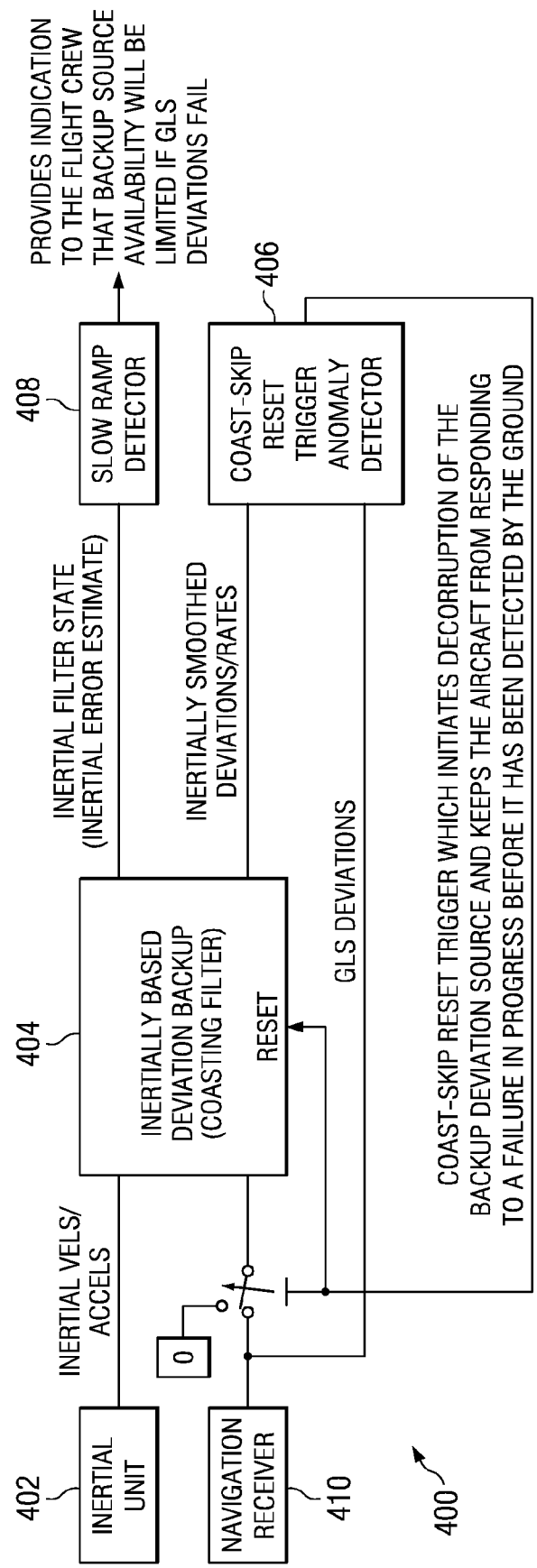
FIG. 4 is a diagram illustrating components used for detecting data anomalies in a landing system in accordance with an advantageous embodiment.

FIG. 4 is a diagram illustrating components used for detecting data anomalies in a landing system in accordance with an advantageous embodiment. GLS anomaly detection system 400 is a system for detecting GLS data anomalies in a GLS system. GLS anomaly detection system 400 includes an inertial unit 402.

Inertial unit 402 is an inertial guidance system. Inertial unit 402 measures linear and angular accelerations applied to the system in an inertial reference frame to coasting filter 404.

Coasting filter 404 may also be referred to as an inertially based deviation backup. Coasting filter 404 may be implemented in any known or available coasting filter, such as, but not limited to, an ILS anomaly detector.

In this example, coasting filter 404 receives inertial data from inertial unit 402. Coasting filter 404 generates inertially complemented GLS deviation and deviation rate. The inertially complemented GLS deviation may also be referred to as a blended inertial deviation magnitude. The deviation rate may also be referred to as the blended inertial deviation rate.

Coasting filter 404 outputs the inertially complemented GLS deviation and deviation rate to coast-skip reset trigger anomaly detector 406.

Coast-skip reset anomaly detector 406 is a new anomaly detector for detecting data anomalies associated with GLS. Coast-skip reset anomaly detector 406 compares the inertial estimates of deviations and rates to GLS deviations and rates to detect GLS anomalies. In other words, coast-skip reset trigger anomaly detector 406 compares the inertially complemented GLS deviation rate output by coasting filter 404 with the raw GLS deviation. Coast-skip reset trigger anomaly detector 406 also compares the blended inertial deviation rate with the raw GLS deviation rate.

Thus, in this example, currently available coasting filter 404 is supplemented with coast-skip reset trigger anomaly detector 406. Coast-skip reset trigger anomaly detector 406 provides coasting filter 404 with immunity to step changes in deviation which are normal for GLS but non-existent for ILS. Coast-skip reset trigger anomaly detector 406 uses a novel step-detection path which is discussed in greater detail below. This step-detection path allows tighter ramp detection thresholds to be set without contribution to anomalous trip rates.

Coast-skip reset trigger anomaly detector 406 identifies the onset of a GLS failure so that inertial coasting can be triggered before the airplane has responded to the failure in progress. These failures manifest themselves in the deviations as ramps or steps of virtually any rate and magnitude. However, steps in the deviations can also result due to nominal events, such as satellite configuration changes as satellites rise and set. Since the probability of these events yielding a position step of less than or equal to three meters is relatively high (0.9999), it is desirable that the anomaly detection be able to distinguish between an anomaly detection trip due to a nominal position step and an unacceptable step in the position. Coast-skip reset trigger anomaly detector 406 flags the slowest possible error ramp rate to achieve the greatest possible coasting performance protection.

In addition to this basic anomaly detection innovation, an additional novel anomaly detector, slow ramp detector 408, may optionally be included to detect ramps that are undetectable by conventional inertial to deviation input comparison. Slow ramp detector 408 and coast-skip reset trigger anomaly detector 406 combine to form comprehensive protection against GLS failures which could cause unacceptable degradation in auto-land performance while coasting through GLS signal outage. This allows full advantage to be gained from the continuity supplement in support of category II and category III certification acceleration and/or operational approval activities.

Navigation receiver 410 is a receiver for receiving signals from satellites and/or ground based navigation stations. The signals may be lost, distorted, or contain erroneous information due to a number of causes or problems with the ground station and/or the satellites.

However, the consistency with which GPS satellite aberrations manifest themselves in the GLS deviations makes the deviations and their associated rates a good choice for monitoring by coast-skip reset trigger anomaly detector 406 and/or slow ramp detector 408 to protect coasting touchdown and rollout performance. This is effective because an error step or ramp in the GLS data will surface immediately in the raw GLS data but will appear much more gradually in their inertially complemented counterparts. Therefore, coast-skip reset trigger anomaly detector compares inertially complemented GLS deviation and deviation rate output by coasting filter 404 against their raw GLS counterparts in a given axis.

Coast-skip reset trigger anomaly detector 406 measures the magnitude comparison against a threshold. Coast-skip reset trigger anomaly detector 406 sets status to coast enable, triggering inertial coasting, when the threshold is exceeded. Coast-skip reset trigger anomaly detector 406 measures the rate comparison against a threshold. Coast-skip reset trigger anomaly detector 406 triggers inertial coasting based on the comparison when the differences in deviation magnitude or deviation rate exceed the respective thresholds. In other words, the rate and magnitude thresholds are independent and, therefore, the deviation magnitude is compared to a deviation magnitude threshold while the deviation rate is compared to an independent deviation rate threshold.

In other words, the resulting mismatch between the inertially complemented GLS deviation and deviation rate and the raw GLS deviation and deviation rate can be measured against a threshold allowing all potentially hazardous hardovers to be detected at their onset without relying on ground station monitoring and/or design of complex monitors against specific system failure modes.

Figure 5:
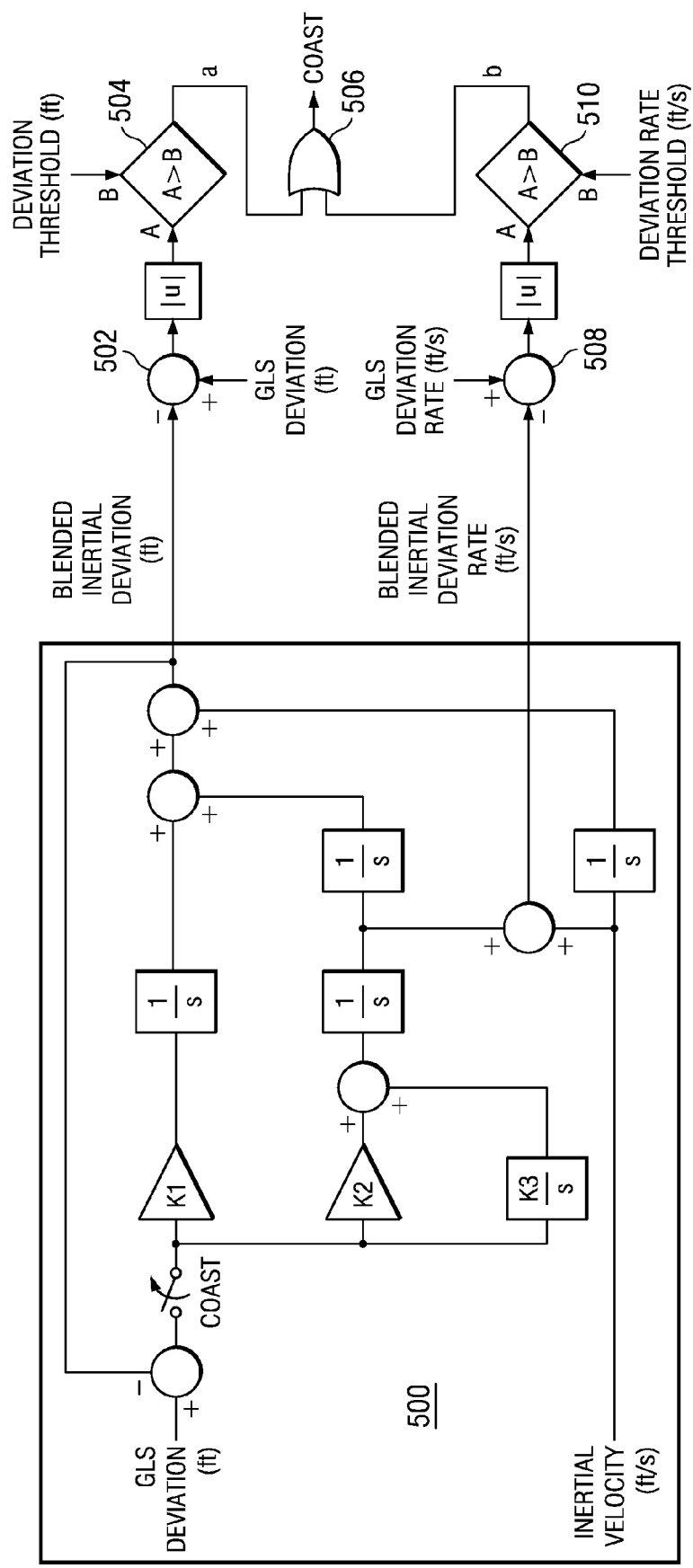
FIG. 5 is a diagram illustrating implementation of coast-skip reset trigger anomaly detection for ramps in accordance with an advantageous embodiment.

Referring now to FIG. 5, a diagram illustrating implementation of coast-skip reset trigger anomaly detection for ramps is shown in accordance with an advantageous embodiment. Coasting filter 500 is a coasting filter, such as coasting filter 404 in FIG. 4. Coasting filter 404 provides blended inertial deviation to a coast-skip reset trigger anomaly detector for comparison to the raw GLS deviations 502 for detecting unacceptable steps in position, such as coast-skip reset trigger anomaly detector 406 in FIG. 4. An unacceptable step is a step in input data that should be disregarded, deleted, or otherwise not relied upon for use in navigational processes due to an anomaly or other error associated with the input data.

The coast-skip reset trigger anomaly detector compares blended inertial deviation to raw GLS deviation difference with a threshold 504 to identify unacceptable steps in the deviation. If an unacceptable step is detected, coast-skip reset trigger anomaly detector sets a status to coast 506 to trigger inertial coasting.

Coasting filter 500 also outputs blended inertial deviation rate to the coast-skip reset trigger anomaly detector for comparison to the raw GLS deviation rate 508 to detect ramps. The coast-skip reset trigger anomaly detector compares blended inertial deviation rate to raw GLS rate difference 508 to deviation rate threshold 510. If the comparison indicates the threshold is exceeded and a step detector indicates this is a ramp and not a step, the coast-skip reset trigger anomaly detector sets a status to coast 506 to trigger inertial coasting.

Thus, the coast-skip reset trigger anomaly detector compares the differenced deviations and rates with a threshold set to provide protection against the slowest possible GLS error ramp-rate and against unacceptable steps in GLS position. The two detection schemes using deviation threshold 504 and deviation rate threshold 510 are designed to work together with the coasting capability of the complementary coasting filter 500.

When an error ramp initially onsets, the deviation rate detection output "b" will trip to trigger the coast-skip reset and opening the filter to the GLS input. Because the corruption due to the onset of the anomaly has been removed by the coasting filter via the coast-skip reset and the GLS deviation is no longer being input to coasting filter 500, if the ramp error persists, the rate difference between filtered and unfiltered anomaly detection input also persists. If the ramp stops and the accumulated error has not exceeded the deviation magnitude detection threshold, the error is within an acceptable range and the deviation can be followed again by the autopilot.

In this case, the deviation rate detection output "b" will no longer be true and the deviation detection output "a" will continue to be false. The coast output clears and allows the GLS deviation information to again be input to the filters. However, if the ramp stops but the error exceeds deviation magnitude detection threshold 504, the output "b" will no longer be true. Because the error accumulated during the ramp is unacceptable, the deviation magnitude detection output "a" will sustain the anomaly detection and the filters continue to coast inertially.

Thus, the process shown in FIG. 5 allows for successfully detecting hazardous ramps and steps in GLS data. However, acceptable size steps may also be rejected in the position solution due to normal satellite configuration changes. This is primarily due to the tighter threshold used to catch the wider range of detrimental error rates for GLS approaches. The negative impact can be seen by looking at a step in the GLS deviation and comparing the resulting raw GLS and filtered outputs as they relate to coasting filter 500. The time history of these outputs and the coast output anomaly flag from coasting filter 500 are shown in FIG. 6 and FIG. 7 below.

Figure 6:
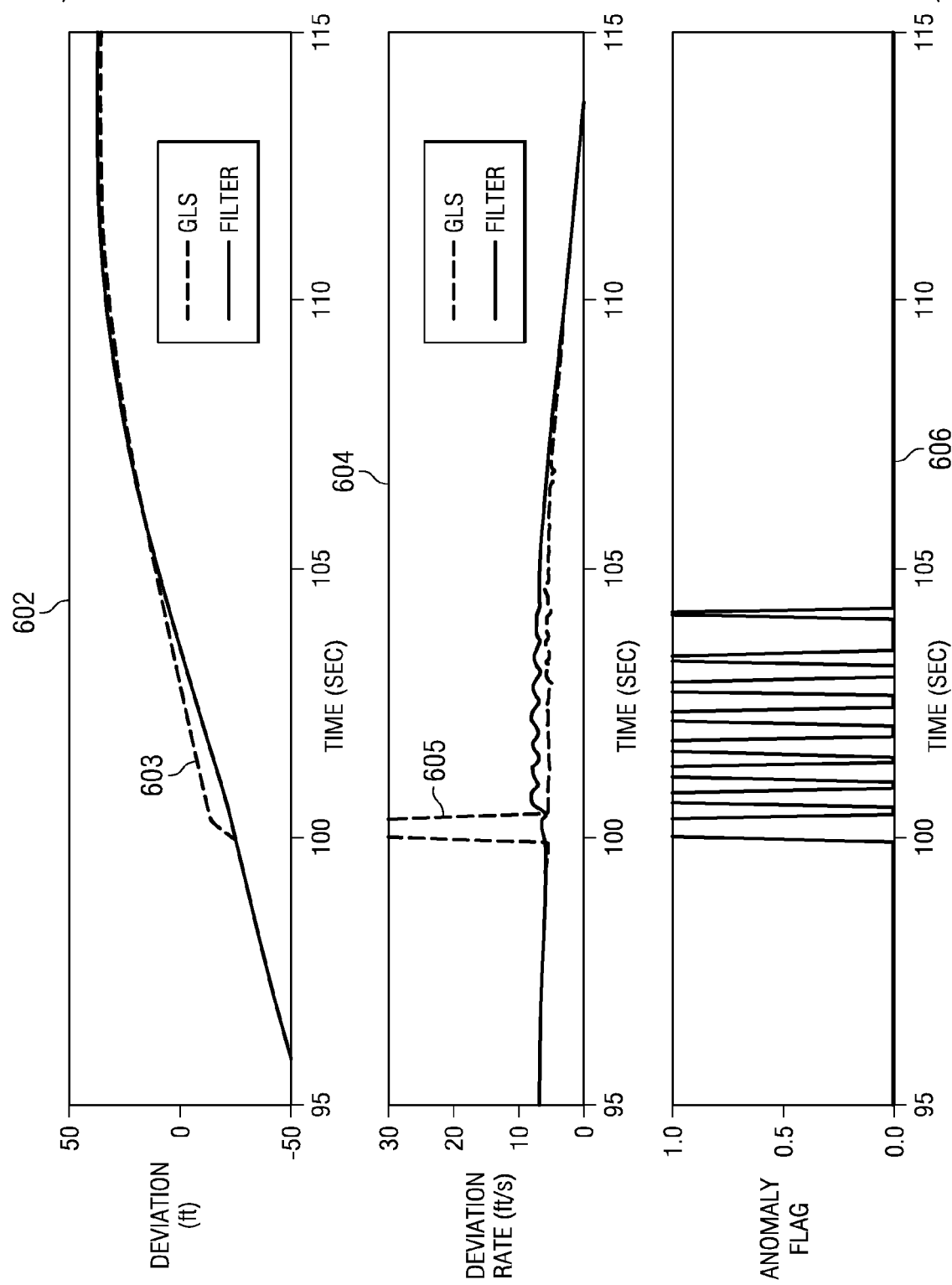
FIG. 6 is a set of graphs illustrating deviation, rate, and anomaly flag without rate-detection logic in the presence of a step in accordance with an advantageous embodiment.
Figure 7:
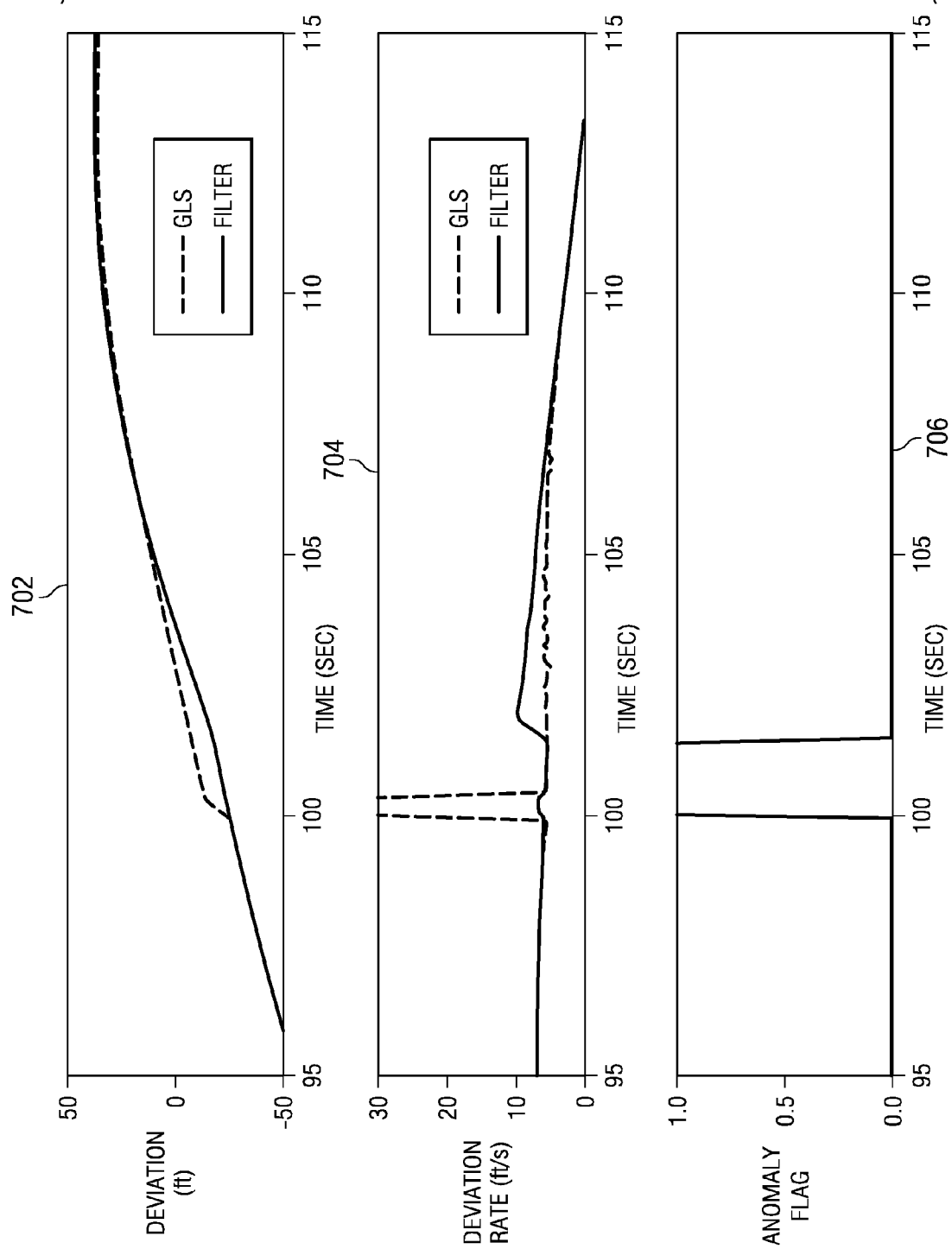
FIG. 7 is a set of graphs illustrating deviation, rate, and anomaly flag with rate detection disable logic in the presence of a step in accordance with an advantageous embodiment.

FIG. 6 is a set of graphs illustrating deviation, rate, and anomaly flag without step-detection logic in the presence of a step in accordance with an advantageous embodiment. Graph 602 shows the raw GLS deviation and inertially blended deviation inputs to the coast-skip trigger anomaly detector. A three meter step is inserted at the elapsed time of 100 seconds at 603.

Graph 604 is a graph of deviation rate input data. Inserting the three meter step at 603 results in a large jump in the raw GLS rate input at 605. When differenced with the inertially blended deviation rate input which initially rejects the step, this propagates into a large rate difference 508. This large jump occurs with a step of any magnitude due to the initial rejection of the step in the filtered rate input due to inertial smoothing. Such a rate difference will exceed the threshold, setting path "b" in FIG. 5, triggering the filter to coast.

However, with the filter open to the GLS input, the filtered and raw GLS deviation-rate begins to track, offset by the magnitude of the onset step. Because the deviation rates are again tracking, the path which was holding the anomaly flag is no longer satisfied. The GLS deviation is re-input to the filter. This is the desired result because if a step of acceptable magnitude onsets, it can not be determined if the position was more correct before or after the step, therefore, the filtered deviation should be allowed to converge to the new GLS deviation.

The deficiency of the detector without step detection logic arises as the filter begins to converge to the new position. For the filtered deviation to converge to the stepped GLS deviation, a rate difference is required between the two. Depending on the size of the step, this has the potential to re-trip the rate detector and set off a cycle of tripping, un-tripping, and/or attempting to converge. Graph 606 illustrates an anomaly flag that is repeatedly tripping and un-tripping from the point where the step is introduced at the elapsed time of 100 seconds to approximately 105 seconds. As can be seen in graph 606, this repeated cycling of tripping, un-tripping, and/or attempting to converge can potentially continue for the duration of the approach, depending on the size of the step, inertial errors, latency, and other factors.

Turning now to FIG. 7, a set of graphs illustrating filtered and raw GLS deviations, rates, and the coast-skip trigger anomaly flag with rate detection disable logic in the presence of a step is shown in accordance with an advantageous embodiment. Again, graph 702 illustrates the inertially blended and raw GLS deviation inputs to which a step has been introduced at elapsed time 100 seconds. The step results in a large jump in the GLS rate input in graph 704.

To eliminate the cycling of the anomaly flag shown in graph 606 in FIG. 6, and ensure that an acceptable sized step is converged upon by the coasting filter, the characteristic rate-trip followed by rate-tracking caused by normal and/or acceptable sized steps in GLS deviation is used to discern a step from a ramp and appropriately disable the rate detection logic. The step is tracked to the filter.

Persistence is required on the tracking of the actual and filtered rates before the anomaly flag clears to assure the initial trip rate was truly due to a step in position. This persistence prevents a step from being declared due to a brief negation of deviation output caused by momentarily erroneous rate-alignment between a GLS error ramp and the filtered deviation due to turbulence or some other outside factor. This additional step detector and the associated rate-detector disable logic are added to the original deviation magnitude/rate detector to complete the coast-skip reset trigger anomaly detector.

The step detector and associated rate-detector disable logic are utilized to supplement the coasting filter and coast-skip reset trigger anomaly detector to eliminate and/or minimize the cycling of the anomaly flag, as shown in graph 706.

Figure 8:
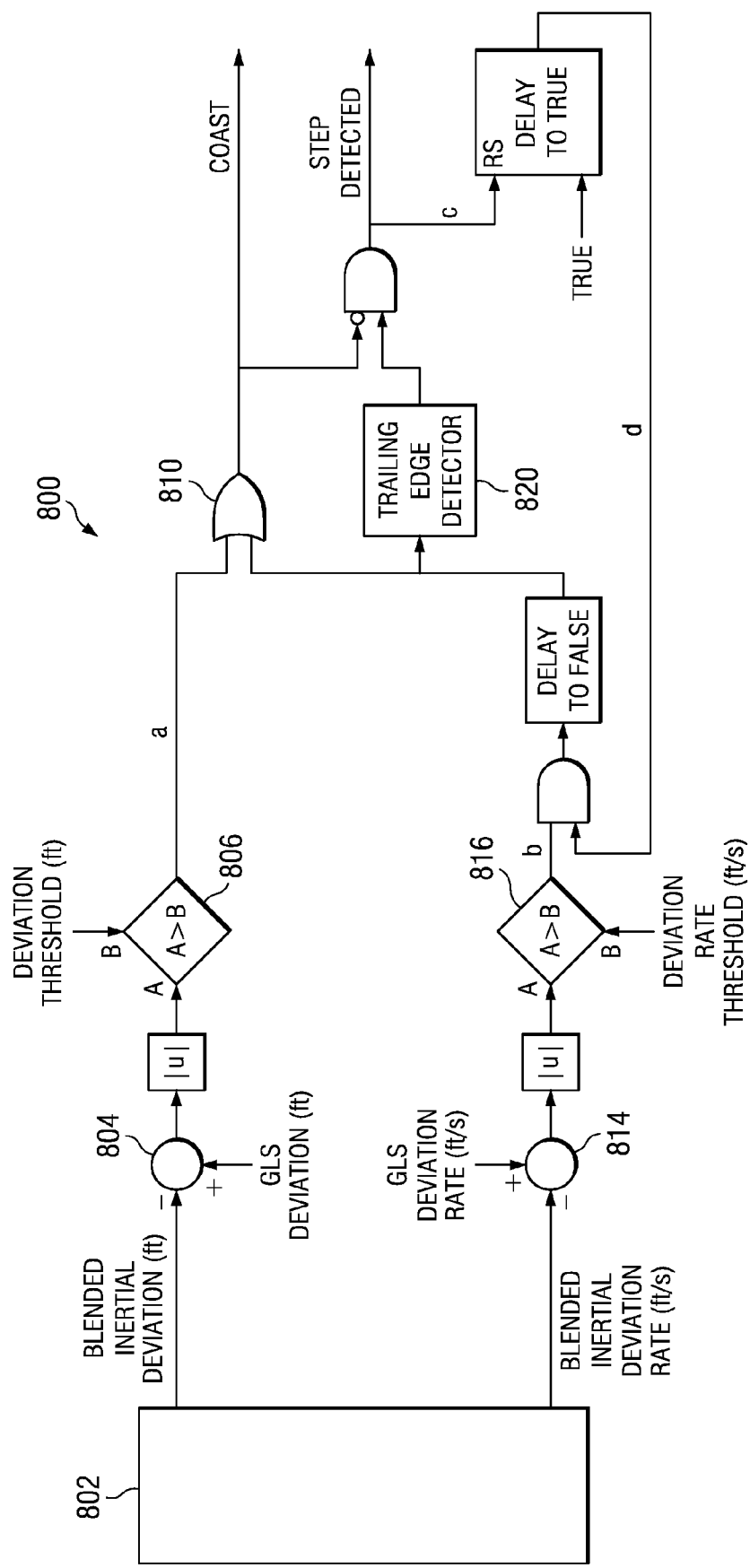
FIG. 8 is a diagram illustrating implementation of coast-skip reset trigger anomaly detection with step detection and associated rate disable logic to minimize anomalous trips due to acceptable steps in position resulting from normal satellite configuration changes in accordance with an advantageous embodiment.

FIG. 8 is a diagram illustrating implementation of coast-skip reset trigger anomaly detection with step detection and associated rate disable logic to minimize anomalous trips due to acceptable steps in position resulting from normal satellite configuration changes in accordance with an advantageous embodiment. Anomaly detector system 800 is a system for detecting GLS data anomalies using a coast-skip reset trigger anomaly detector and a trailing edge detector with step detection and associated rate disable logic to minimize anomalous trips due to acceptable steps in position resulting from normal satellite configuration changes.

Coasting filter 802 is a coasting filter, such as, but not limited to, coasting filter 404 in FIG. 4. Coasting filter 404 in FIG. 4 is supplemented by a coast-skip reset trigger anomaly detector, such as coast skip reset trigger anomaly detector 406 in FIG. 4.

Coasting filter 802 outputs blended inertial deviation input to difference 804 and blended inertial deviation rate input to difference 814. The coast-skip reset trigger anomaly detector compares the blended inertial deviation to raw GLS deviation difference 804 to deviation threshold 806. Deviation threshold input to comparator 806 is a magnitude threshold.

If the threshold is exceeded, the coast-skip reset trigger anomaly detector triggers inertial coasting 810. The coast-skip reset trigger anomaly detector also compares blended inertial deviation rate to raw GLS deviation rate difference 814 with deviation rate threshold 816. If deviation rate threshold 814 is exceeded and the step detector indicates this is a ramp and not a step, the coast-skip reset trigger anomaly detector triggers inertial coasting 810.

Returning to the example in FIGS. 6 and 7 where a three meter step is inserted, the effects of the step can be traced as the effects propagate through anomaly detector system 800. At time 100 seconds when the step is inserted, there is a large difference observed between blended inertial deviation rate and the raw GLS rate 814 which exceeds the threshold 816 setting path "b." Because nothing thus far has reset the input "d", the and-gate of "b" and "d" is satisfied and coast is set to trigger inertial coasting 810. At this point, the time histories shown in FIGS. 6 and 7 are identical.

However, as the filtered deviation rate once again begins to track the GLS deviation rate, the added step detection logic for trailing edge detector 812 becomes active. When blended inertial deviation rate and the raw GLS rates track persistently, the rate threshold comparison 816 is no longer exceeded and the rate path of anomaly detector system 800 "b" is no longer satisfied. Coast is set to false, re-inserting the GLS deviation into the filter.

With this additional logic, trailing edge detector 820 of coast triggers "c" to reset the output "d" to false temporarily until a time delay has elapsed. During that predetermined period of time for the time delay, the predicted rate difference sets path "b" as the filtered deviation converges to the stepped GLS deviation. Without the step detection logic, this would again cause the filter to coast. With the step detection logic, however, the rate-input to the anomaly detection is effectively disabled by the "d" input to the and-gate. While the rate detection is momentarily disabled, the performance is still protected by the deviation magnitude monitor to trigger to coast-skip and activate inertial coasting via path "a".

Trailing edge detector 820 enables coasting filter 802 to have immunity to steps in the position solution due to normal satellite configuration change, such as, without limitation, steps large enough to trip the rate detection but small enough that they do not trip the magnitude detection. Trailing edge detector 820 does not interfere with the rejection of unacceptable sized steps which trip both the rate detection initially and persistently exceed deviation threshold 806 at "a". In this example, anomaly detector system 800 enables both the desired ramp and step error detection capability and the desired immunity to normal GPS position steps.

In this example in FIG. 8, anomaly detector system 800 works as a step detector and can discern between an anomaly in the data resolving itself such that no convergence is required, such that the system remains in coast the whole time, and an acceptable sized step that anomaly detector system 800 needs to converge to. The trailing edge of the coast declares a step. It is the trailing edge of the rate trip coinciding with coast going inactive that permits the step error to be declared.

In another embodiment, a similar effect is obtained by increasing the rate detection thresholds. However, unacceptable reduction in the ramp detection capability of the detector could result. This provides protection against GLS aberrations which are bounded by the time-to-alert.

A slow ramp detector, such as slow ramp detector 408 in FIG. 4, provides protection against GLS anomalies which are not bounded by the time-to-alert. These very slowly developing ramp-like errors, such as, without limitation, those that result from steep ionospheric gradient, have essentially the same affect on the touchdown dispersion as a constant guidance error of the size that the slow ramp error has accumulated at the flare initiation altitude. Coasting performance, however, is impacted more severely by these errors. For example, if the reference error is increasing at a low enough frequency, the error will be incorporated into the blended solution via the inertial bias estimate, while the conflicting inertial low-frequency information is rejected. Such a corrupted inertial reference, over time, can lead to unacceptable touchdown and rollout off the runway.

These effects typically cannot be distinguished from the differences resulting from delays between the inertial data and the GLS guidance in the presence of turbulence. This motivates the second innovation in the GLS anomaly detection system, the slow ramp detector.

Figure 9:
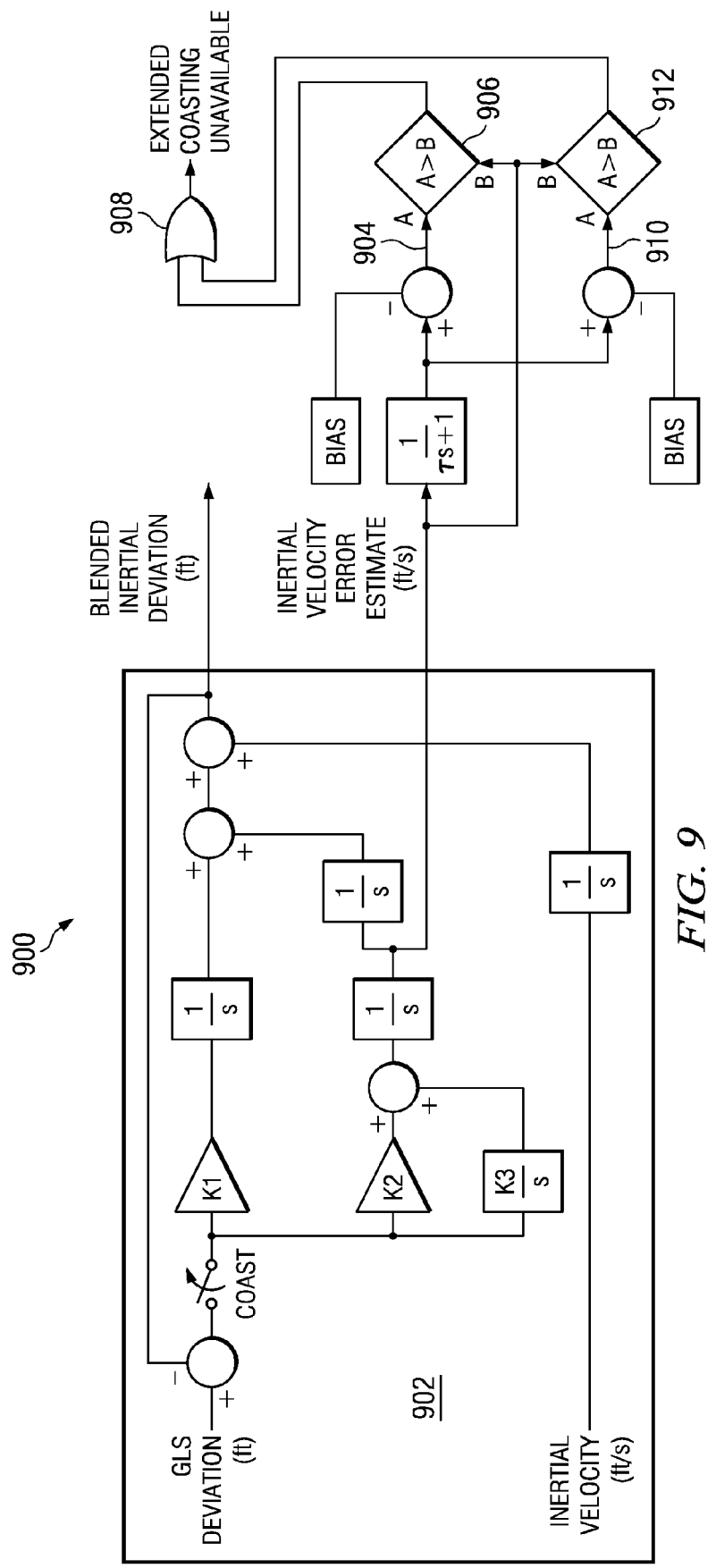
FIG. 9 is a diagram illustrating implementation of a slow ramp detector using inertial velocity input to a coasting filter in accordance with an advantageous embodiment.

Referring now to FIG. 9, a diagram illustrating implementation of a slow ramp detector using inertial velocity input to a coasting filter is depicted in accordance with an advantageous embodiment. Slow ramp detector system 900 detects ramp errors which onset too slowly to be detectable by the coast-skip reset trigger anomaly detector.

Coasting filter 902 is a coasting filter, such as, without limitation, coasting filter 404 in FIG. 4. Coasting filter 902 provides inertial velocity error estimates to the slow ramp detector. The slow ramp detector inputs the inertial error estimate into a first order lag filter. The error estimate is biased in the positive and negative directions in the lag filter to create an upper and lower bound around the error estimate. The upper and lower bound forms a dynamic threshold that includes both upper threshold value 910 and lower threshold value 904. In other words, the upper bound forms upper threshold 910 and the lower bound forms lower threshold 904. To ensure that the thresholds are initialized properly, this filtering does not commence until the inertial error estimates have settled.

When the inertial error estimate has settled and the thresholds have been set, the slow ramp detector compares the inertial error estimate to the upper bound 910 at 912. If the bias estimate is greater than the upper bound at 912, the slow ramp detector initiates an annunciation 908 to the flight crew indicating that extended coasting is unavailable.

Likewise, the slow ramp detector compares the inertial error estimate to the lower threshold 904 at 906. If the inertial error estimate is less than the lower threshold 904, the slow ramp detector sends annunciation 908 to the flight crew indicating that extended coasting is unavailable.

Thus, slow ramp detector system 900 limits the GLS coasting duration because coasting may be corrupted by the detected ramp. In this example, the coast-skip reset can not be applied to de-corrupt the coasting filter because unlike the coast-skip reset detection, because of the slower rate of the errors detectable by the slow ramp detector system, there is no guarantee that the ramp has been detected within the 6 second coast-skip reset buffer window.

Slow ramp detector system 900 triggers fault response such that subsequent, persistent loss of GLS deviation information or trigger of the coast-reset trigger anomaly detector, results in a mode failure. At slow ramp detection, the loss of extended GLS coasting capability is annunciated to the flight deck via an auto-land status annunciation indicating that extended coasting is unavailable.

The annunciation indicates the loss of fail-operative rollout capability. This annunciation allows the pilots to adjust their minimums and take appropriate action when the decision height is reached. In one embodiment, the annunciation is a "No Land 3" annunciation which indicates the loss of fail-operative capability.

The exact reason the corrupted coasting filter becomes detrimental to performance is the principle which allows these ramps to be detectable by slow ramp detection system 900. For example, the dominant error on the inertial sources input to coasting filter 902 is accelerometer tilt error known as the Schuler error. The behavior of this Schuler error is well known to oscillate between the minimum and maximum values with an 84 minute period. Therefore, over the approximately 200 seconds of an auto-land, there will be little variation in the Schuler error.

Thus, the inertial error or bias estimate used in coasting filter 902 is a signal which stays relatively constant throughout the approach in the presence of fault-free GLS conditions. Coasting filter 902 also reacts predictably to a slow error in progress by incorporating the error rate into the bias estimate without responding to the outside effects of wind conditions, turbulence and aircraft orientation. This predictable behavior in faulted and fault-free conditions regardless of outside effects makes is a convenient choice for monitoring to detect these slow ramp errors.

The inertial error can be either positive or negative and the GLS error can likewise onset in either direction. Constant inertial bias estimate limits do not provide a stringent enough bound to enable this magnitude of error to be detectable. Therefore, the advantageous embodiments recognize that dynamic inertial error estimate thresholds are needed to create an upper and lower bound on the bias estimate which can reliably catch error ramps in either direction, while being able to appropriately drift with the normal expected drift of inertial error.

The key to the success of these dynamic inertial error estimate thresholds is the tuning of the time constant of the lag filter. It must be fast enough that it allows slow drift of the limits as the inertial error drifts in its Schuler oscillation while being slow enough that the bounds do not react to the onset of a GLS error ramp. The bias estimate reaction to a genuine ramp error is able to exceed the thresholds, tripping the detector, before the thresholds have been corrupted by the error ramp.

Similarly, though the effects of turbulence and wind conditions are relatively small, the offset applied to the filtered inertial bias estimate to create upper threshold 910 and lower threshold 904 on the slow ramp detector is set such that anomalous trips do not result. This allows slow ramp detector system 900 in this example, to reliably catch slowly growing GLS errors with minimal anomalous trips.

Figure 10:
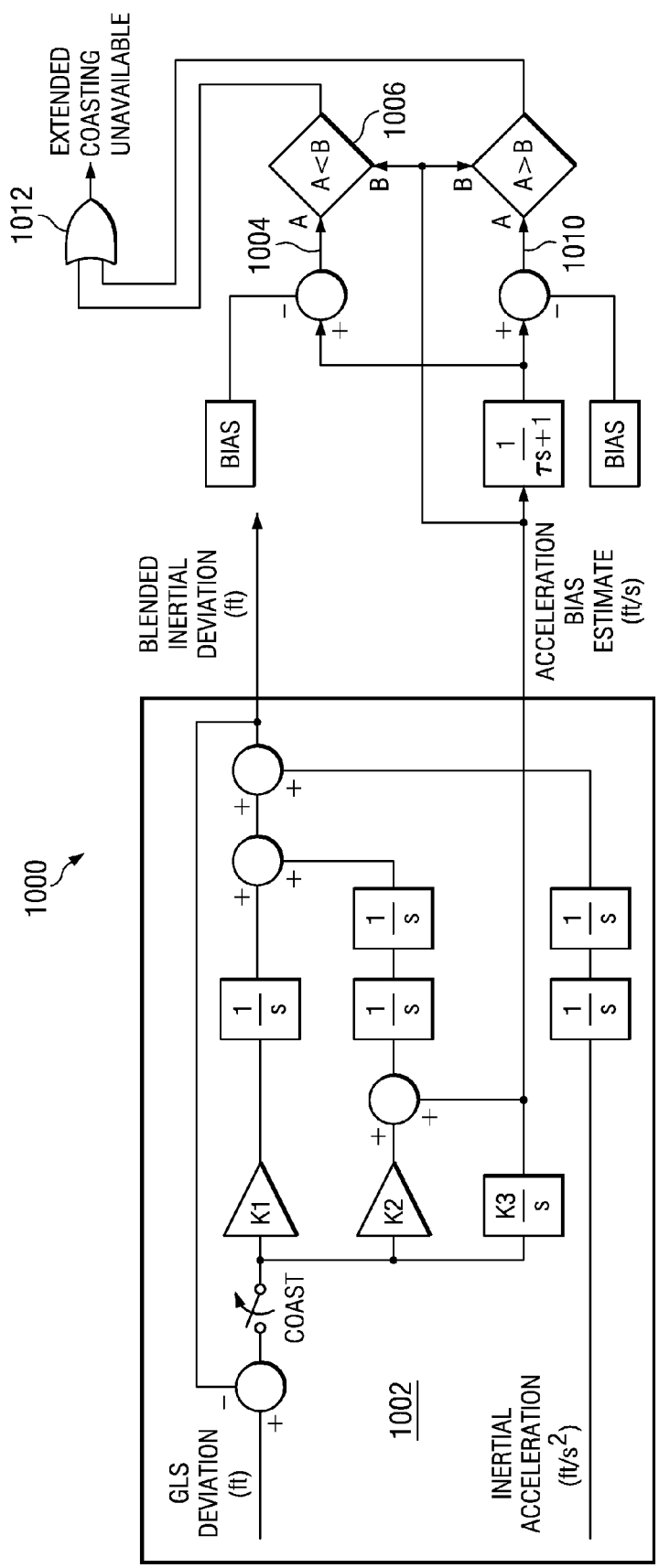
FIG. 10 is a diagram illustrating implementation of a slow ramp detector using inertial acceleration input to a coasting filter in accordance with an advantageous embodiment.

FIG. 10 is a diagram illustrating implementation of a slow ramp detector using inertial acceleration input to the coasting filter in accordance with an advantageous embodiment. Slow ramp detector system 1000 is a coasting filter that comprises a slow ramp detector.

Coasting filter 1002 is a coasting filter, such as coasting filter 404 in FIG. 4. Coasting filter 1002 provides blended inertial acceleration error estimates. The slow ramp detector creates an upper and lower bound on the inertial error or bias estimate which can reliably catch error ramps in either direction while being able to appropriately drift with the normal expected drift of inertial error to form dynamic thresholds.

Slow ramp detector inputs the acceleration bias estimate into a lag filter and biases the bias estimate in both the positive and negative directions to create an upper and lower bound around the bias estimate. The upper bound forms upper dynamic threshold 1010. The lower bound forms lower dynamic threshold 1004.

The inertial error estimate is compared to upper dynamic threshold 1010 and lower dynamic threshold 1004. If the subsequent bias estimate is greater than upper dynamic threshold 1010 at operation 1012, or less than lower dynamic threshold 1004 at operation 1006, annunciation 1008 is made indicating that extended coasting is unavailable. This filtering process, whereby the inertial error estimate is compared to the dynamic thresholds, does not commence until the inertial error estimate has settled.

Figure 11:
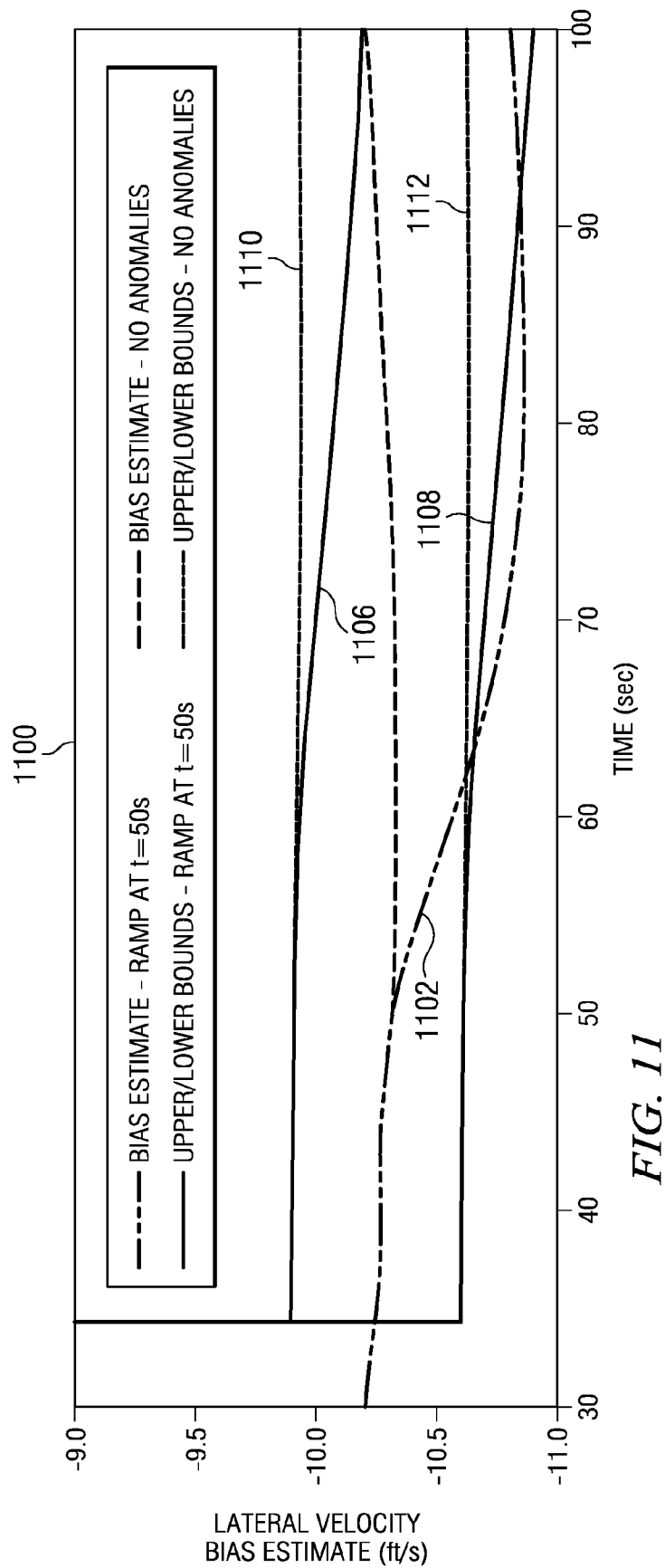
FIG. 11 is a graph illustrating an error insertion comparison in accordance with an advantageous embodiment.

Referring now to FIG. 11, a graph illustrating an error insertion comparison is depicted in accordance with an advantageous embodiment. Graph 1100 shows a sample GLS error insertion comparison with a negative 0.5 feet per second (ft/s) error ramp applied at 50 seconds elapsed time in heavy turbulence.

Line 1102 is the bias estimate with the ramp occurring at approximately 50 seconds. Lines 1106 and 1108 show the upper and lower dynamic thresholds associated with the bias estimate with the ramp that is illustrated in line 1102. For comparison, line 1104 shows a nominal bias estimate with no anomalies. Lines 1110 and 1112 show the nominal bias estimate's associated dynamic thresholds with no GLS errors inserted.

At approximately 35 seconds of elapsed time, the criteria have been met in the approach to enable this detector. Then, at approximately 50 seconds of elapsed time, the GLS error ramp is inserted. Regardless of GLS latency and turbulence applied, the insertion of the 0.5 ft/s GLS error ramp is attributed to the inertial error and drives the bias estimate that is being monitored to violate the dynamic thresholds.

The drift of the dynamic thresholds in lines 1106 and 1108 is slow enough that they can accurately detect such a ramp error even though they begin to drift in the ramp's direction at its onset.

Figure 12:
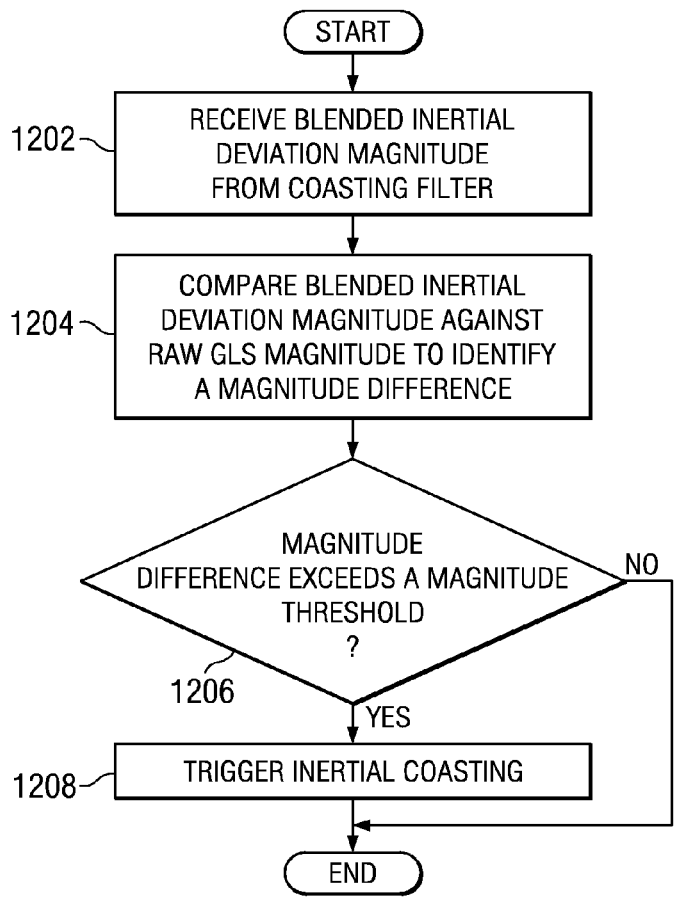
FIG. 12 is a flowchart of a process for detecting data anomalies in accordance with an advantageous embodiment.

FIG. 12 is a flowchart of a process for detecting data anomalies in accordance with an advantageous embodiment. The process in FIG. 12 may be implemented by an anomaly detector using a magnitude threshold, such as coast skip reset trigger anomaly detector, such as coast skip reset trigger anomaly detector 406 in FIG. 4.

The process begins by receiving a blended inertial deviation magnitude from a coasting filter, such as coasting filter 404 in FIG. 4 (operation 1202). The process compares the blended inertial deviation magnitude against the raw GLS magnitude to identify a magnitude difference (operation 1204).

The process makes a determination as to whether the magnitude difference exceeds a magnitude threshold (operation 1206). If the magnitude difference does not exceed the threshold, the process terminates thereafter. Returning to operation 1206, if the magnitude difference does exceed the threshold, the process triggers inertial coasting (operation 1208) with the process terminating thereafter.

In one embodiment, triggering the inertial coasting also triggers de-corruption of the coasting filter via the coast-skip reset. The coast skip reset de-corrupts the coasting filter by removing the erroneous blended inertial deviation data from the filter.

Figure 13:
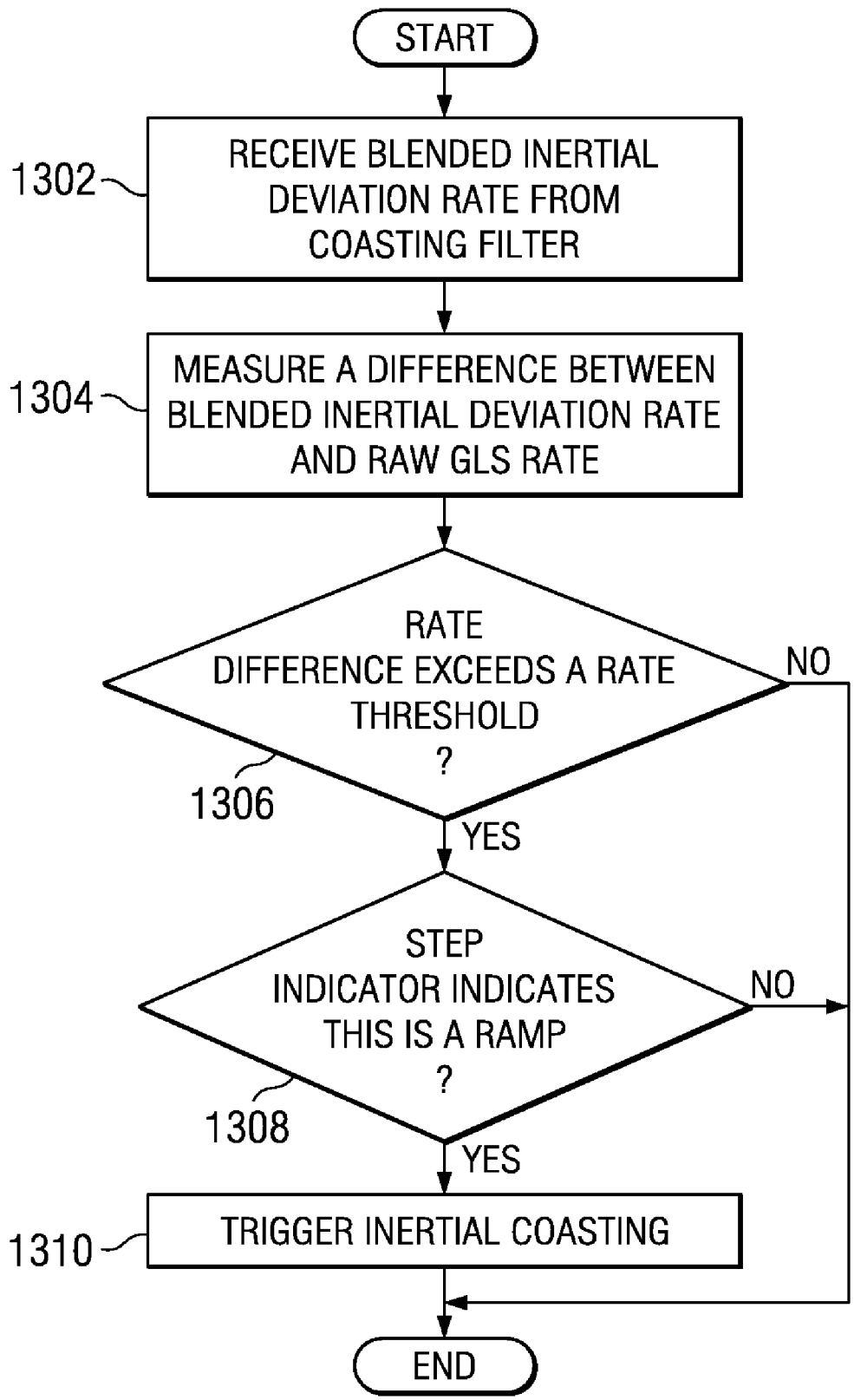
FIG. 13 is a flowchart of a process for detecting a ramp error in accordance with an advantageous embodiment.

Referring now to FIG. 13, a flowchart of a process for detecting a ramp error is shown in accordance with an advantageous embodiment. The process in FIG. 13 may be implemented by an anomaly detector using a deviation rate threshold, such as coast skip reset trigger anomaly detector, such as coast skip reset trigger anomaly detector 406 in FIG. 4.

The process begins by receiving a blended inertial deviation rate from a coasting filter (operation 1302). The process measures a difference between the blended inertial deviation rate and the raw GLS rate (operation 1304). The process then makes a determination as to whether the rate difference exceeds a rate threshold (operation 1306). If the difference does not exceed the rate threshold, the process terminates thereafter.

Returning to operation 1306, if the difference does exceed the rate threshold, the process determines whether the step indicator indicates this is a ramp rather than a step (operation 1308). If this is a step, the process terminates thereafter.

Returning to operation 1308, if this is a ramp, the process triggers inertial coasting (operation 1310) with the process terminating thereafter. In other words, if the difference exceeds the threshold and this is a ramp and not a step, inertial coasting is triggered and de-corruption of the coasting filter is initiated.

Figure 14:
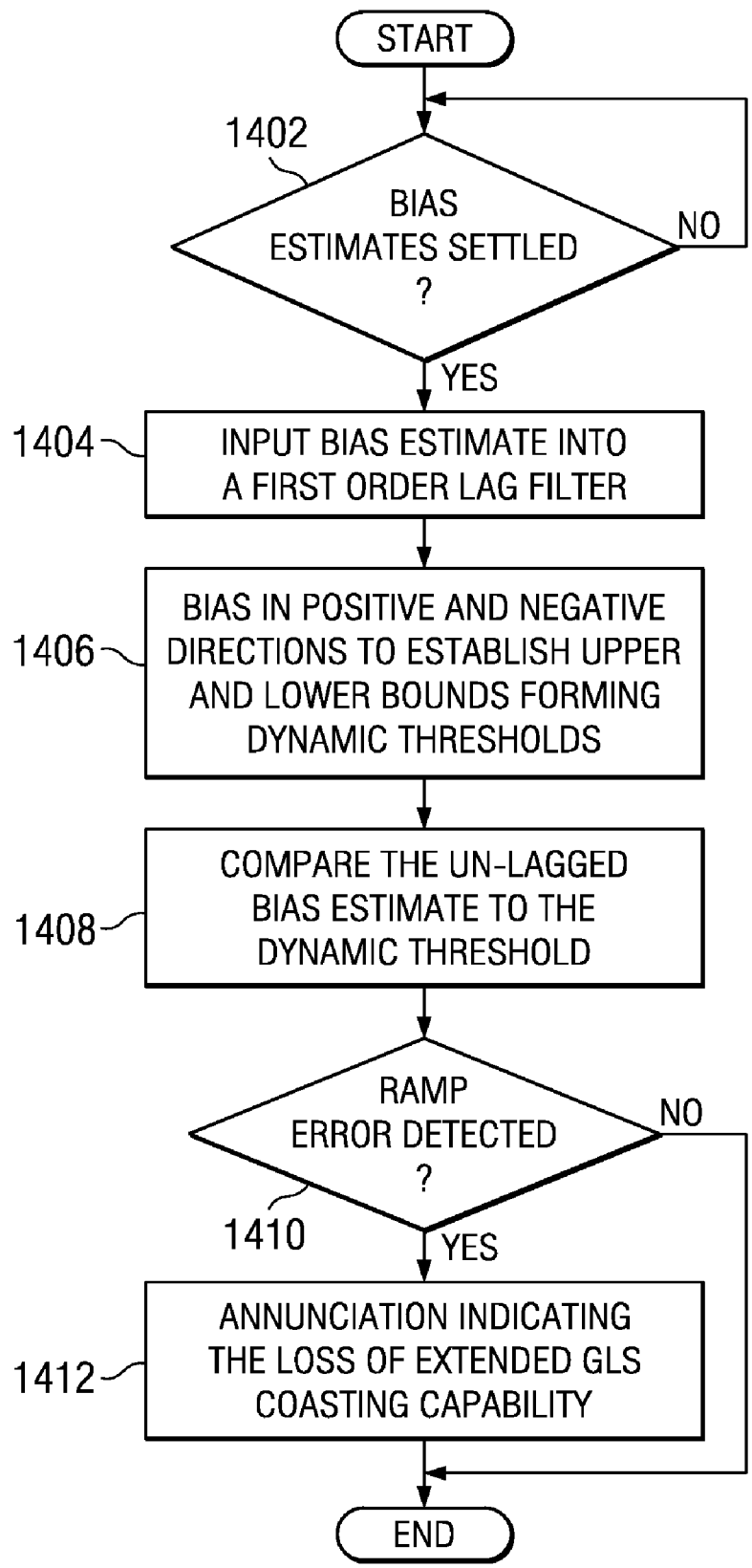
FIG. 14 is a flowchart of a process for detecting slow onset data anomalies using a dynamic threshold in accordance with an advantageous embodiment.

FIG. 14 is a flowchart of a process for detecting slow onset data anomalies using a dynamic threshold in accordance with an advantageous embodiment. The process in FIG. 14 may be implemented by an anomaly detector using a slow ramp detector, such slow ramp detector 408 in FIG. 4.

The process begins by making a determination as to whether the inertial error estimate is settled (operation 1402). If the error estimate is not settled, the process returns to operation 1402 until the error estimate is settled. The process then inputs the inertial error estimate into a first order lag filter (operation 1404). The process biases the error estimate in the positive and negative direction to establish an upper and lower bound around the inertial error estimate to form a dynamic upper threshold and a dynamic lower threshold (operation 1406).

The process compares the un-lagged inertial error estimate to the dynamic thresholds (operation 1408). The process makes a determination as to whether a ramp error is detected (operation 1410). A ramp error is detected if the un-lagged error estimate is greater than the dynamic upper threshold or less than the dynamic lower threshold. If a ramp error is not detected, the process terminates thereafter.

Returning to operation 1410, if a ramp error is detected, the process sends an annunciation indicating the loss of extended GLS coasting capability (operation 1412).

Figure 15:
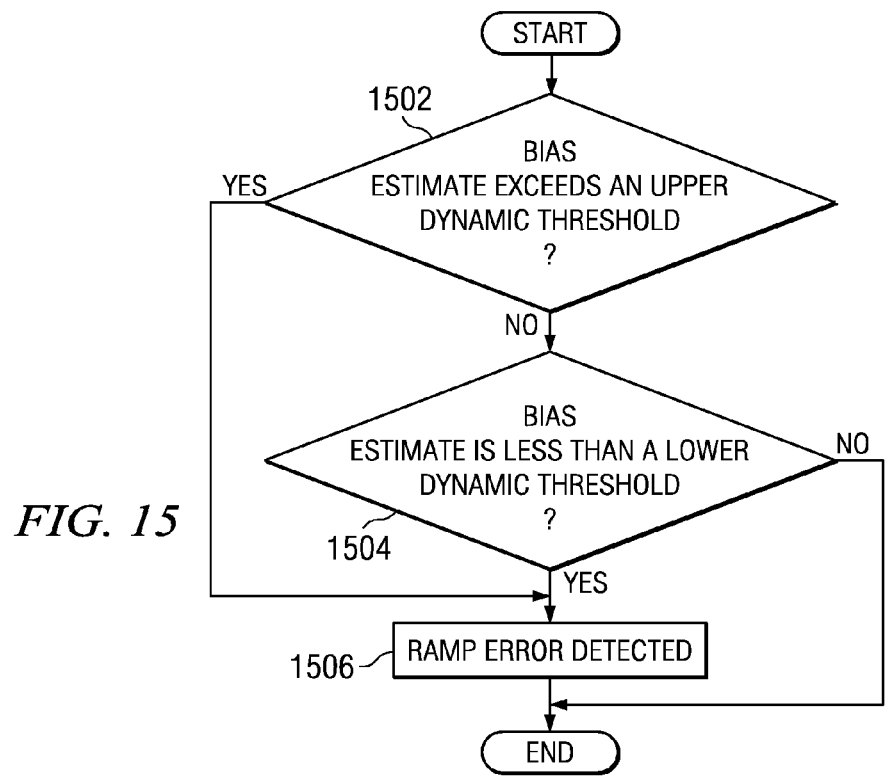
FIG. 15 is a flowchart of a process for utilizing dynamic thresholds to detect slow onset ramp errors in accordance with an advantageous embodiment.

Turning now to FIG. 15, a flowchart of a process for utilizing dynamic thresholds to detect slow onset ramp errors is shown in accordance with an advantageous embodiment. The process in FIG. 15 is a more detailed description of operation 1410 in FIG. 14. The process may be implemented by a slow ramp detector, such as slow ramp detector 408 in FIG. 4.

The process begins by making a determination as to whether the un-lagged inertial error estimate, otherwise referred to as the bias estimate, exceeds an upper dynamic threshold (operation 1502). If the bias estimate does not exceed the upper threshold, the process makes a determination as to whether the bias estimate is less than a lower dynamic threshold (operation 1504). If the bias estimate is not lower than the lower threshold, the process terminates thereafter.

If the bias estimate is higher than the upper threshold at operation 1502 and/or if the bias estimate is lower than the lower dynamic threshold at operation 1504, the process detects a ramp error (operation 1506) with the process terminating thereafter.

The different advantageous embodiments provide a computer implemented method, apparatus, and computer usable program code detecting data anomalies in a landing system. In one embodiment, a magnitude difference between a blended inertial deviation magnitude and a raw deviation magnitude is identified to form a magnitude difference. The magnitude difference is compared to a magnitude threshold. If the magnitude difference exceeds the magnitude threshold, an anomaly in the data is detected.

The process is related to GNSS landing systems (GLS) and more particularly, to detecting anomalous GLS data by comparing raw GLS data magnitudes/rates with inertially blended data and applying a threshold to the differences. Delay circuits are also utilized to implement a coast-reset-trigger anomaly detector, as well as a slow ramp detector to detect unexpected deviations in GLS data.

The process provides protection against GLS failures which could cause unacceptable degradation of data while coasting through GLS signal outage by ignoring step changes in deviation due fault-free operations of satellites as they rise and set, as well as other normal satellite configuration changes. This process allows tighter ramp thresholds to be generated and utilized for anomaly detection. The process detects slow ramps that are undetectable by conventional comparisons of inertial data to deviation input.

Thus, the process provides a coast-skip-reset anomaly detection method for triggering coast mode while ignoring normal steps in satellite position error. The process also provides a slow ramp mode for detecting slow degradation of satellite data. This provides additional capability for earlier detection of anomalous behavior in GPS signals. When the loss of extended GLS coasting capability is detected, an annunciation is made to the flight deck indicating a loss of fail-operative rollout capability. This is an improvement over existing landing systems and solves a problem with current GLS systems. This system offers customers additional confidence in the navigational accuracy. This system increases safety by ensuring the integrity of the coasting filter deviations as a backup guidance source. In other words, the system increases confidence in the navigational accuracy of the system and ensures accuracy of the backup guidance system.

The advantageous embodiments provide a safe category I, category II, and even category III GLS systems. The process may be utilized to detect anomalous GLS data in GLS systems for navigation during take-off, autopilot, navigation, and/or landing associated with any type of aircraft or navigable device, including, but not limited to, airplanes, unmanned aerial vehicles (UAV), air or space vehicles, rockets, driver-less vehicles, such as driver-less cars, and/or any other type of manned or unmanned aircraft.

The flowcharts and block diagrams in the different depicted embodiments illustrate the architecture, functionality and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The description of the different advantageous embodiments has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A computer implemented method for detecting data anomalies in a landing system, the computer implemented method comprising:
    identifying a magnitude difference between a blended inertial deviation magnitude and a raw deviation magnitude in a landing system associated with a global navigation satellite system to form a magnitude difference, wherein the blended inertial deviation magnitude and the raw deviation magnitude are landing system data from the landing system associated with the global navigation satellite system;
    comparing the magnitude difference to a magnitude threshold; and
    responsive to the magnitude difference exceeding the magnitude threshold, detecting an anomaly in the landing system data.

2. The computer implemented method of claim 1 further comprising:
    measuring a difference between a blended inertial deviation rate and a raw deviation rate in the landing system associated with the global navigation satellite system to form a rate difference;
    responsive to the rate difference exceeding the magnitude threshold, determining whether the rate difference indicates a ramp or a step; and
    responsive to the rate difference indicating a ramp, detecting an anomaly in the landing system data.

3. The computer implemented method of claim 2 further comprising:
    responsive to detecting an anomaly, triggering inertial coasting.

4. The computer implemented method of claim 1 further comprising:
    generating dynamic inertial error estimate thresholds having an upper dynamic threshold and a lower dynamic threshold;
    comparing an un-lagged bias estimate to the dynamic inertial error estimate thresholds to determine whether a ramp error is detected, and
    responsive to the un-lagged bias estimate being higher than the upper dynamic threshold of the dynamic inertial error estimate thresholds, detecting a ramp error, wherein the ramp error indicates an anomaly in the landing system data.

5. The computer implemented method of claim 4 wherein the dynamic inertial error estimate threshold comprises an upper threshold and a lower threshold, and further comprising:
    responsive to the un-lagged bias estimate exceeding the upper dynamic threshold, detecting the ramp error; and
    responsive to the un-lagged bias estimate being lower than the lower threshold, detecting the ramp error.

6. The computer implemented method of claim 5 further comprising:
    responsive to detecting the ramp error, indicating a loss of extended coasting capability associated with the global navigation satellite system.

7. The computer implemented method of claim 4 wherein generating the dynamic threshold further comprises:
    inputting a bias estimate into a lag filter and generating an upper bound and a lower bound around the bias estimate;
    generating an upper dynamic threshold using the upper bound; and
    generating a lower dynamic threshold using the lower bound, wherein the upper dynamic threshold and the lower dynamic threshold forms the dynamic threshold.

8. The computer implemented method of claim 7 wherein the bias estimate is a velocity bias estimate.

9. The computer implemented method of claim 7 wherein the bias estimate is an acceleration bias estimate.

10. A computer program product comprising:
    a computer usable medium including computer usable program code for detecting data anomalies in a landing system, the computer program product comprising:
    identifying a magnitude difference between a blended inertial deviation magnitude and a raw deviation magnitude in a landing system associated with a global navigation satellite system to form a magnitude difference, wherein the blended inertial deviation magnitude and the raw deviation magnitude are landing system data from the landing system associated with the global navigation satellite system;
    comparing the magnitude difference to a magnitude threshold; and
    responsive to the magnitude difference exceeding the magnitude threshold, detecting an anomaly in the landing system data.

11. The computer program product of claim 10 further comprising:
    computer usable program code for measuring a difference between a blended inertial deviation rate and a raw deviation rate in the landing system associated with the global navigation satellite system to form a rate difference;
    computer usable program code for determining whether the rate difference indicates a ramp or a step in response to the rate difference exceeding the magnitude threshold in response to the rate difference exceeding the magnitude threshold; and
    computer usable program code for detecting an anomaly in the data in response to the rate difference indicating a ramp.

12. The computer program product of claim 10 further comprising:
    computer usable program code for generating dynamic inertial error estimate thresholds having an upper dynamic threshold and a lower dynamic threshold;

computer usable program code for comparing an un-lagged bias estimate to the dynamic inertial error estimate thresholds to determine whether a ramp error is detected; and computer usable program code for, responsive to the un-lagged bias estimate being higher than the upper dynamic threshold of the dynamic inertial error estimate thresholds, detecting a ramp error, wherein the ramp error indicates an anomaly in the landing system data.

13. The computer program product of claim 12 wherein the dynamic inertial error estimate threshold comprises an upper threshold and a lower threshold, and further comprising:

computer usable program code for detecting the ramp error in response to the un-lagged bias estimate exceeding the upper dynamic threshold; and computer usable program code for detecting the ramp error in response to the un-lagged bias estimate being lower than the lower threshold.

14. The computer program product of claim 13 further comprising:

computer usable program code for indicating a loss of extended coasting capability associated with the global navigation satellite system in response to detecting the ramp error.

15. The computer program product of claim 12 further comprising:

computer usable program code for inputting a bias estimate into a lag filter;

computer usable program code for biasing the bias estimate in a positive direction and in a negative direction to generate an upper bound and a lower bound around the bias estimate;

computer usable program code for generating an upper dynamic threshold using the upper bound; and computer usable program code for generating a lower dynamic threshold using the lower bound, wherein the upper dynamic threshold and the lower dynamic threshold forms the dynamic threshold.

16. The computer program product of claim 10 further comprising:

computer usable program code for triggering inertial coasting in response to detecting the anomaly in the landing system data.

17. An anomaly detector in a landing system associated with a global navigation satellite system for detecting anomalies in landing system data, the anomaly detector comprising:

a coasting filter, wherein the coasting filter generates a blended inertial deviation magnitude and a blended inertial deviation rate;

a coast skip reset trigger anomaly detector, wherein the coast skip reset trigger anomaly detector identifies a magnitude difference between the blended inertial deviation magnitude and a raw deviation magnitude to form a magnitude difference; measures a difference between a blended inertial deviation rate and a raw deviation rate to form a rate difference; compares the magnitude difference to a magnitude threshold; detects an anomaly in the landing system data in response to the magnitude difference exceeding the magnitude threshold; and detects the anomaly in the landing system data if the rate difference exceeds the magnitude threshold and the rate difference indicates a ramp.

18. The anomaly detector of claim 17 further comprising:

a slow ramp detector, wherein the slow ramp detector generates dynamic inertial error estimate thresholds having an upper dynamic threshold and a lower dynamic threshold; compares an un-lagged bias estimate to the dynamic inertial error estimate thresholds to determine whether a ramp error is detected; and responsive to the un-lagged bias estimate being higher than the upper dynamic threshold of the dynamic inertial error estimate thresholds, detecting a ramp error, wherein the ramp error indicates an anomaly in the landing system data.

19. The anomaly detector of claim 18 further comprising:

a lag filter, wherein the lag filter receives a bias estimate; biases the bias estimate in a positive direction and in a negative direction to generate an upper bound and a lower bound around the bias estimate; and wherein the slow ramp detector generates an upper dynamic threshold using the upper bound; and generates a lower dynamic threshold using the lower bound, wherein the upper dynamic threshold and the lower dynamic threshold forms the dynamic threshold.

20. The anomaly detector of claim 18 further comprising:

an indicator, wherein the indicator indicates a loss of extended coasting capability associated with the global navigation satellite system in response to detecting a ramp error.

* * * * *